(12) United States Patent
Guochunxu et al.

(10) Patent No.: US 8,352,074 B2
(45) Date of Patent: Jan. 8, 2013

(54) PATH PLANNING APPARATUS AND METHOD OF ROBOT

(75) Inventors: Guochunxu, Suwon-si (KR); Kyung Shik Roh, Seongnam-si (KR); San Lim, Suwon-si (KR); Bok Man Lim, Seoul (KR); Myung Hee Kim, Suwon-si (KR)

(73) Assignee: Samsung Electronics, Suwon (KR)

( * ) Notice: Subject to any disclaimer, the term of this patent is extended or adjusted under 35 U.S.C. 154(b) by 246 days.

(21) Appl. No.: 12/805,269

(22) Filed: Jul. 21, 2010

(65) Prior Publication Data

US 2011/0035053 A1 Feb. 10, 2011

(30) Foreign Application Priority Data

Aug. 10, 2009 (KR) ........................ 10-2009-0073154

(51) Int. Cl.
*G05B 19/18* (2006.01)

(52) U.S. Cl. .......... 700/255; 700/86; 700/245; 700/247; 700/252; 700/258; 901/2; 901/9; 901/15; 901/29; 901/47; 414/277; 414/937; 414/939; 414/744.6; 204/298.25; 118/500; 118/719; 219/136

(58) Field of Classification Search ..................... 700/86, 700/245, 247, 252, 255, 258; 901/2, 9, 15, 901/29, 47; 414/277, 937, 939, 744.6; 204/298.25; 118/500, 719; 318/587, 568.11; 370/400; 219/136

See application file for complete search history.

(56) References Cited

U.S. PATENT DOCUMENTS

| | | | |
|---|---|---|---|
| 7,269,479 B2 * | 9/2007 | Okamoto et al. | 700/245 |
| 7,313,464 B1 * | 12/2007 | Perreault et al. | 700/245 |
| 7,333,879 B2 * | 2/2008 | Takizawa et al. | 700/259 |
| 7,337,040 B2 * | 2/2008 | Takenaka et al. | 700/245 |
| 7,424,342 B2 * | 9/2008 | Beniyama et al. | 700/245 |
| 2006/0184273 A1 * | 8/2006 | Sawada et al. | 700/245 |
| 2006/0235570 A1 * | 10/2006 | Jung | 700/245 |

* cited by examiner

*Primary Examiner* — James Trammell
*Assistant Examiner* — McDieunel Marc
(74) *Attorney, Agent, or Firm* — Staas & Halsey LLP (57) ABSTRACT

A path planning apparatus and method of a robot, in which a path, along which the robot accesses an object to grasp the object, is planned. The path planning method includes judging whether or not a robot hand of a robot collides with an obstacle when the robot hand moves along one access path candidate selected from plural access path candidates along which the robot hand accesses an object to grasp the object, calculating an access score of the selected access path candidate when the robot hand does not collide with the obstacle, and determining an access path plan using the access score of the selected access path candidate.

13 Claims, 6 Drawing Sheets

FIG. 6

PATH PLANNING APPARATUS AND METHOD OF ROBOT

CROSS-REFERENCE TO RELATED APPLICATIONS

This application claims the benefit of Korean Patent Application No. 2009-0073154, filed on Aug. 10, 2009 in the Korean Intellectual Property Office, the disclosure of which is incorporated herein by reference.

BACKGROUND

1. Field

Embodiments of the present invention relate to a path planning apparatus and method of a robot, in which a path, along which the robot accesses an object to grasp the object, is planned.

2. Description of the Related Art

In general, robots conduct operations in dangerous work conditions, simply repeated operations, and operations requiring large force on behalf of humans. Recently, these robots have been widely used in various fields, such as medical, military, aerospace, agricultural, and household fields, as well as on industrial spots.

Robots on industrial spots are widely used in a transfer field, as well as welding, assembly, painting, and inspection fields. When robots are used in the transfer field, it is important to safely and precisely grasp and transfer a target object to be transferred.

Particularly, automatic operation of a robot, which grasps an object to be transferred while avoiding collision with obstacles, is considerably important. In order to achieve the automatic operation of the robot, a process of planning a transfer path of the robot, along which the robot accesses the object to be transferred, is required.

Conventionally, the planning of the transfer path was completed by selecting the optimum grasp path, along which the robot does not collide with an obstacle, from a plurality of grasp paths having various directions.

However, since the grasp path in the above method is selected in consideration of only whether or not the robot collides with the obstacle, such a method generates a difficulty in precisely selecting the grasp path.

SUMMARY

Therefore, it is one aspect of the present embodiment to provide a path planning apparatus and method of a robot, in which an access path is precisely planned through judgment as to whether or not the robot collides with an obstacle existing on the access path and calculation of an access score between the robot and the obstacle.

Additional aspects of the embodiment will be set forth in part in the description which follows and, in part, will be obvious from the description, or may be learned by practice of the invention.

The foregoing and/or other aspects are achieved by providing a path planning method of a robot including: judging whether or not a robot hand of the robot collides with an obstacle, when the robot hand moves along a first access path candidate selected from a plurality of access path candidates along which the robot hand accesses an object to grasp the object; calculating an access score of the selected first access path candidate when the robot hand is judged to not collide with the obstacle; and determining an access path plan using the access score of the selected first access path candidate.

The path planning method may further include: selecting another access path candidate from remaining access path candidates except for the first selected access path candidate when the robot hand is judged to collide with the obstacle; and performing the judging, and subsequently performing the calculating for the selected other access path candidate when the robot hand is judged to not collide with the obstacle.

The judging and the selecting another access path candidate when the robot hand is judged to collide with the obstacle or calculating the access score when the robot hand is judged to not collide with the obstacle may be repeated for all the plurality of remaining access path candidates.

The determining of the access path plan using the access score may include: aligning the access scores of the plurality of access path candidates for which the robot hand is judged to not collide with the obstacle in descending order; selecting a first non-collision access path candidate for which the robot hand is judged to not collide with the obstacle, from the plurality of access path candidates for which the robot hand is judged to not collide with the obstacle, having a relatively high score; judging whether or not the robot hand succeeds in grasping the object while moving the robot hand along the selected first non-collision access path candidate; and determining the selected first non-collision access path candidate as an access path of the robot when the robot hand succeeds in grasping the object.

The path planning method may further include: selecting another non-collision access path candidate for which the robot hand is judged to not collide with the obstacle having a relatively high score from the remaining non-collision access path candidates except for the previously selected first non-collision access path candidate when the robot hand does not succeed in grasping the object; and performing the moving and the grasping success judging of the selected other non-collision access path candidate.

The selecting another non-collision access path candidate, the moving, and the grasping success judging may be repeated for all the plurality of remaining non-collision access path candidates until the robot hand succeeds in grasping the object.

The judging as to whether or not the robot hand collides with the obstacle may be achieved by judging whether or not a virtual object surrounding the robot hand collides with the obstacle.

The access score of the access path candidate may be calculated using an access function based on the minimum distance between the robot hand and the obstacle, a length of the robot hand, and a length of a robot arm of the robot.

The access function may be calculated by Equation 1 below, $$G(\text{score}) = \text{Exp}(\omega * \text{Detect\_Dis}/\text{Max\_range}) \qquad [\text{Equation 1}]$$

here, Detect_Dis is the minimum distance between the robot hand and the obstacle, Max_range is the sum of the length of the robot hand and the length of the robot arm, and $\omega$ is a constant.

The foregoing and/or other aspects are achieved by providing a path planning apparatus for a robot including: a judgment unit to judge whether or not a robot hand of the robot collides with an obstacle, when the robot hand moves along one access path candidate selected from a plurality of access path candidates along which the robot hand accesses an object to grasp the object; a calculation unit to calculate an access score of the selected access path candidate when the robot hand is judged to not collide with the obstacle; and a control unit to determine an access path plan using the access score of the selected access path candidate.

The judgment unit may judge whether or not a virtual object surrounding the robot hand collides with the obstacle.

The access score of the access path candidate may be calculated using an access function based on the minimum distance between the robot hand and the obstacle, a length of the robot hand, and a length of a robot arm of the robot.

The access function may be calculated by Equation 1 below, $$G(score)=Exp(\omega*Detect\_Dis/Max\_range) \qquad \text{[Equation 1]}$$

here, Detect_Dis is the minimum distance between the robot hand and the obstacle, Max_range is the sum of the length of the robot hand and the length of the robot arm, and ω is a constant.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiment, examples of which are illustrated in the accompanying drawings, wherein like reference numerals refer to like elements throughout.

Figure 1:
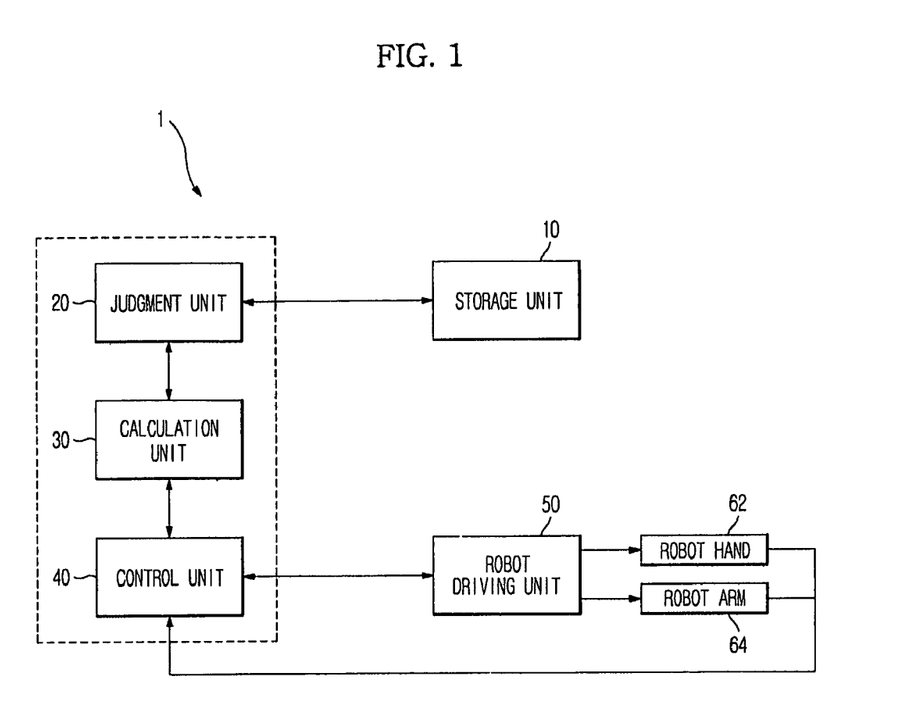
FIG. 1 is a control block diagram of a path planning apparatus of a robot in accordance with one embodiment.
Figure 2:
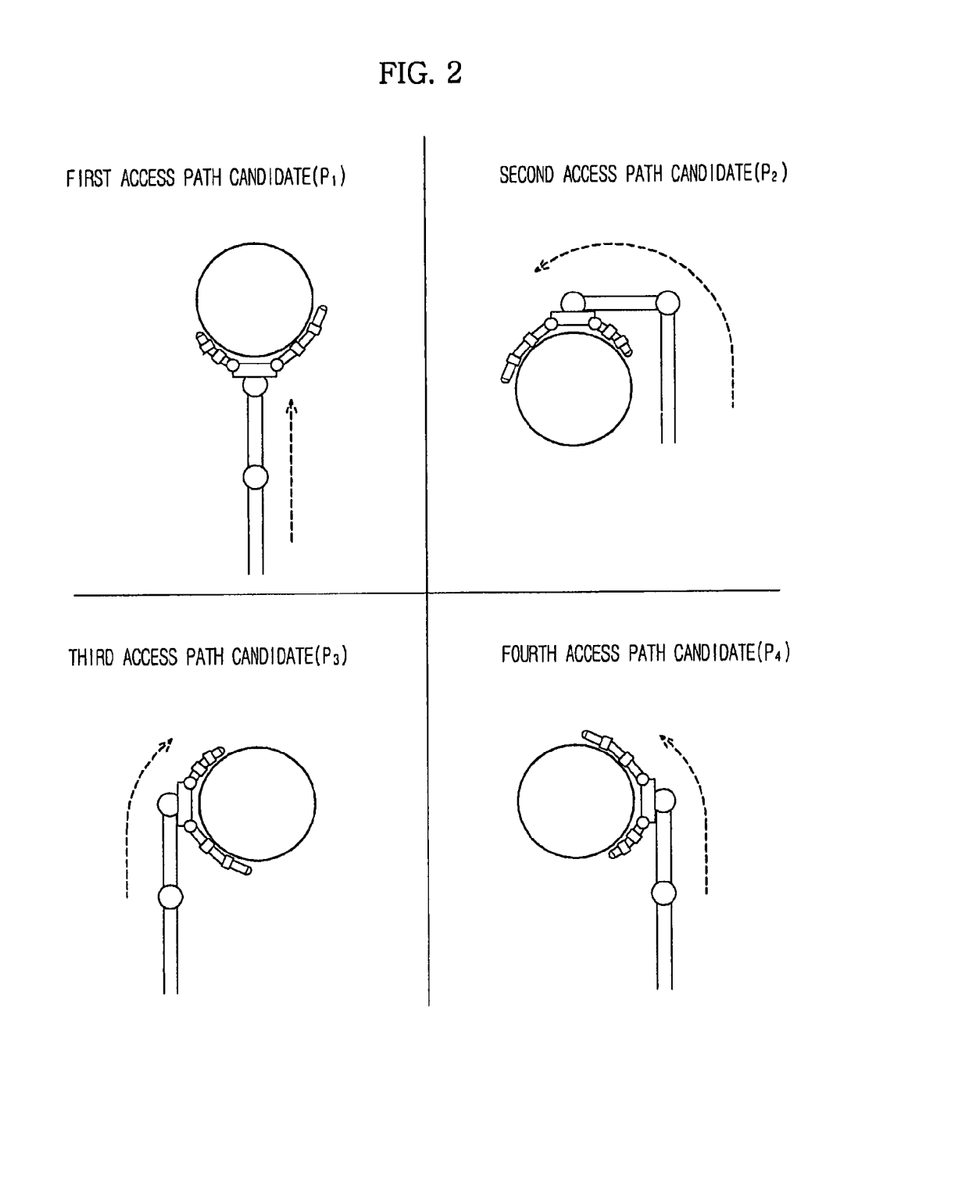
FIG. 2 is a view illustrating a plurality of access path candidates in accordance with the embodiment.
Figure 3:
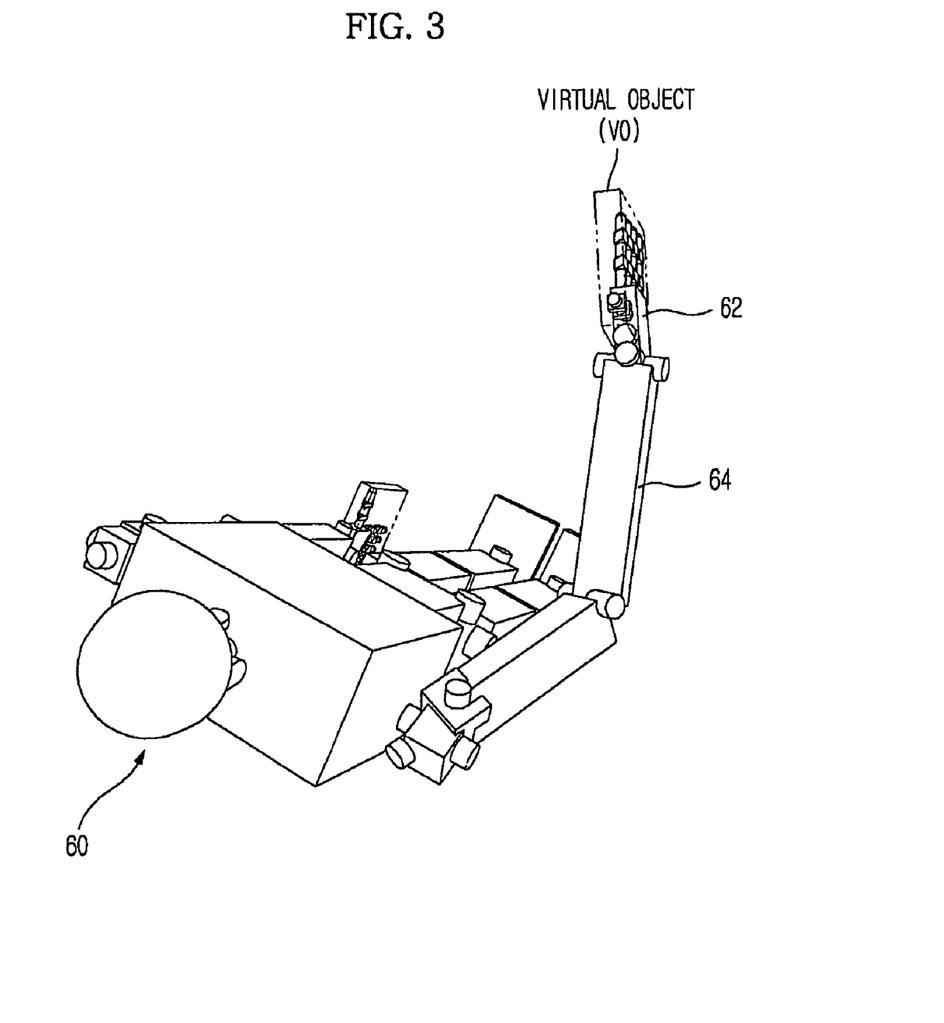
FIG. 3 is a view illustrating a virtual object in accordance with the embodiment.
Figure 4:
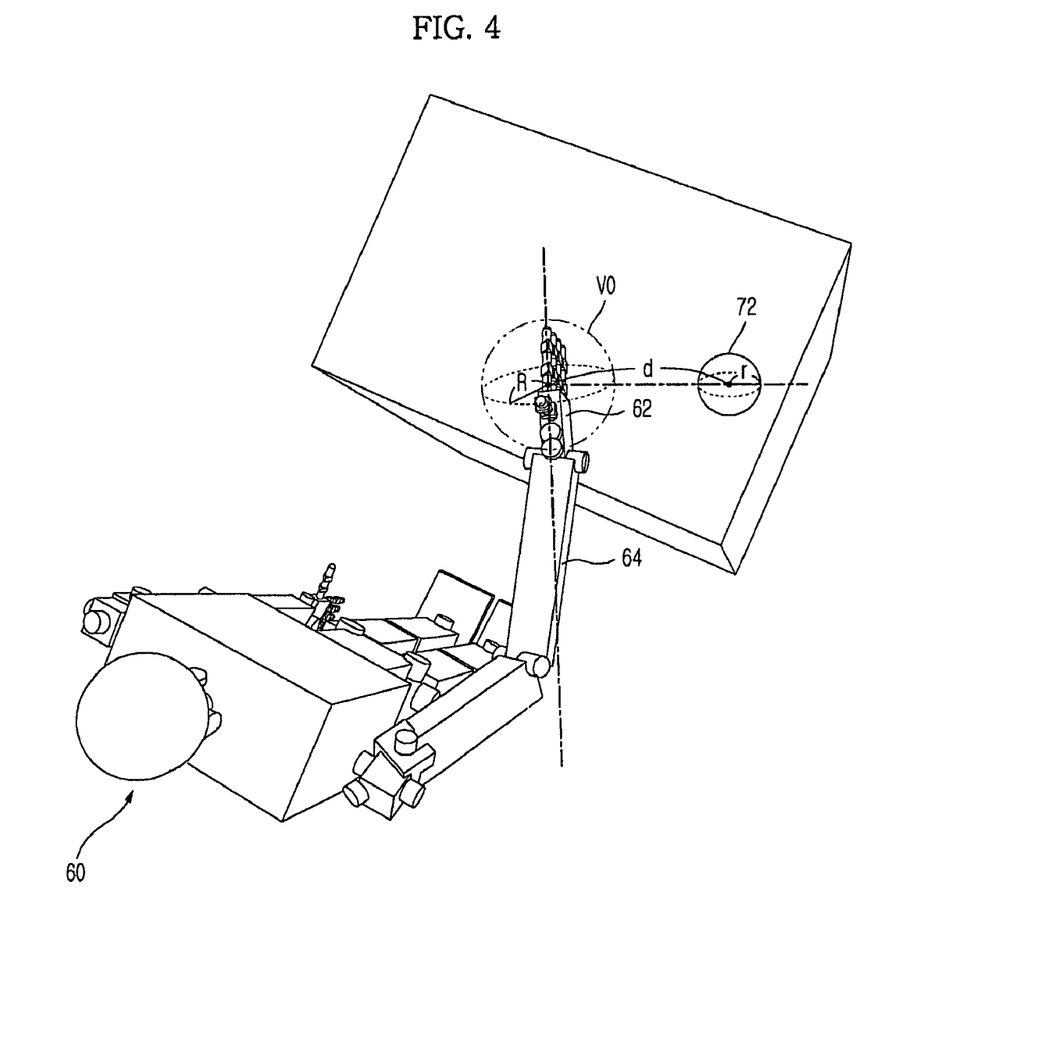
FIG. 4 is a view illustrating collision between the virtual object and an obstacle in accordance with the embodiment.

FIG. 1 is a control block diagram of a path planning apparatus of a robot in accordance with one embodiment, FIG. 2 is a view illustrating a plurality of access path candidates in accordance with the embodiment, FIG. 3 is a view illustrating a virtual object in accordance with the embodiment, and FIG. 4 is a view illustrating collision between the virtual object and an obstacle in accordance with the embodiment.

As shown in FIG. 1, a path planning apparatus 1 in accordance with the embodiment includes a storage unit 10, a judgment unit 20, a calculation unit 30, a control unit 40, and a robot driving unit 50.

The storage unit 10 stores a plurality of access path candidates, along which a robot hand 62 accesses an object to grasp the object. In FIG. 2, the access path candidates are approximately generated based on position data of the object, which are obtained in advance through a method, such as mapping, for example.

Further, after an image around a robot is obtained using a vision system, the relative position of the object to the robot hand 62 is detected from the image around the robot, and then the access path candidates of the robot hand 62 are generated based on the detected relative position.

Further, the storage unit 10 stores data regarding objects and obstacles, in addition to the plural access path candidates.

The storage unit 10 includes a storage medium, which stores robot program data, such as a movement algorithm of the robot, data regarding objects and obstacles, and the plural access path candidates, such as a dynamic random access memory (DRAM), a synchronous DRAM (SDRAM), a rambus DRAM (RDRAM), a double date rate DRAM (DDRAM), or a static random access memory (SRAM).

The judgment unit 20 selects one access path candidate among the plural access path candidates, and judges whether or not the robot hand 62 collides with an obstacle, when the robot hand 62 moves along the selected access path candidate.

In more detail, since the access path candidates stored in the storage unit 10 are approximate access paths generated using the relative position of the object to the robot hand 62, effective access path candidates used as effective access paths are first detected through a process of judging whether or not the robot hand 62 collides with an obstacle according to the access path candidates.

Hereinafter, with reference to FIGS. 3 and 4, the process of judging whether or not the robot hand 62 collides with an obstacle will be described.

Since the robot hand 62 and the obstacle have various shapes, a complicated calculation process is required to detect whether or not the robot hand 62 collides with the obstacle according to various shapes.

Therefore, as shown in FIG. 3, a virtual object VO surrounding the robot hand 62, instead of the robot hand 62, is formed, and the judgment unit 20 judges whether or not the virtual object VO collides with an obstacle. Here, the virtual object VO may be an object having various shapes, such as a rectangular shape or a cylindrical shape.

In FIG. 4, when it is supposed that both the virtual object VO and an obstacle 72 have a spherical shape, the judgment unit 20 judges that the virtual object VO does not collide with the obstacle 72 if the sum of a radius R of the virtual object VO and a radius r of the obstacle 72 is smaller than a distance d between the virtual object VO and the obstacle 72 (R+r<d).

On the other hand, the judgment unit 20 judges that the virtual object VO collides with the obstacle 72 if the sum of the radius R of the virtual object VO and the radius r of the obstacle 72 is equal to or greater than the distance d between the virtual object VO and the obstacle 72 (R+r≧d). As the result of the judgment, when it is judged that the virtual object VO collides with the obstacle 72, the judgment unit 20 selects another access path candidate among the plural access path candidates, except for the previously selected access path candidate, and judges whether or not the virtual object VO collides with the obstacle 72 when the virtual object VO moves along the selected access path candidate. That is, the judgment unit 20 repeats judgment of collision of the virtual object VO with the obstacle 72 with respect to the plural access path candidates.

The calculation unit 30 calculates an access score of the access path candidate, when it is judged that the robot hand 62 (i.e., the virtual object VO) does not collide with the obstacle 72.

Here, the access score of the access path candidate is calculated using an access function based on the minimum distance between the robot hand 62 and the obstacle 72, a length of the robot hand 62, and a length of a robot arm 64. The access function is calculated by Equation 1 below.

$$G(score)=Exp(\omega*Detect\_Dis/Max\_range) \qquad \text{[Equation 1]}$$

Here, Detect_Dis is the minimum distance between the robot hand 62 and the obstacle 72, Max_range is the sum of the length of the robot hand 62 and the length of the robot arm 64, and ω is a constant.

Figure 5:
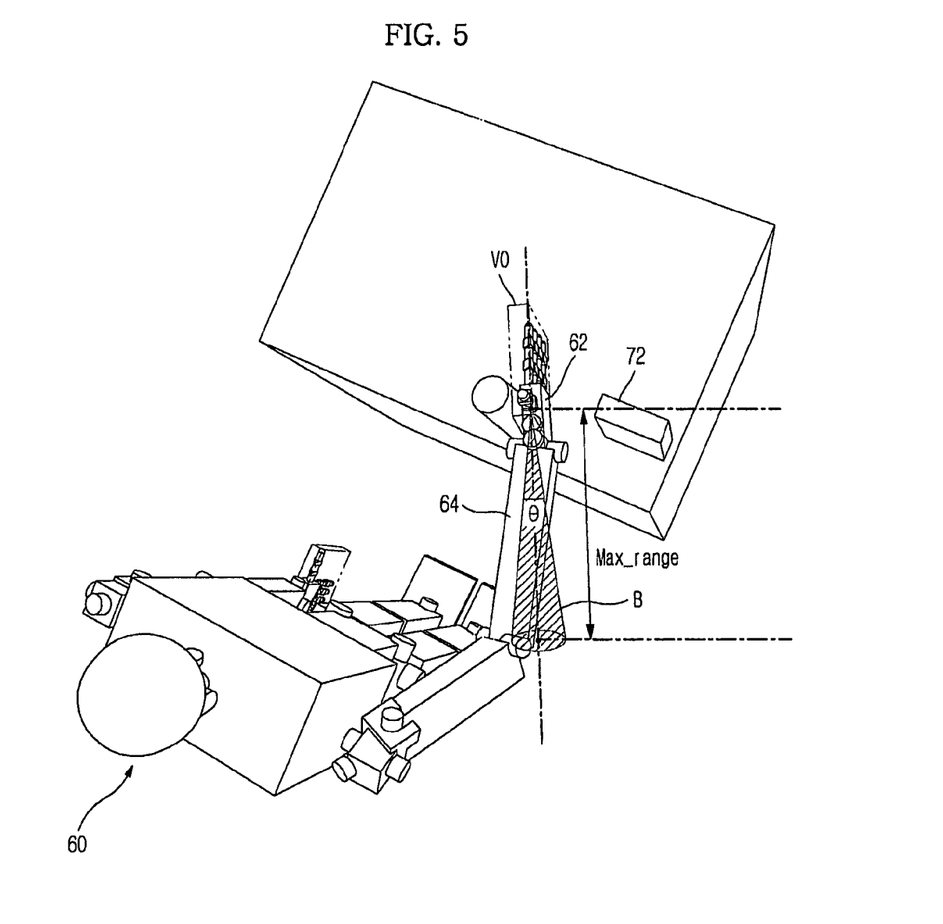
FIG. 5 is a view illustrating a cone-shaped detection area to calculate an access function in accordance with the embodiment.

FIG. 5 is a view illustrating a cone-shaped detection area to calculate the access function in accordance with the embodiment.

In FIG. 5, the access function is modeled using a detection area B according to the access path candidate (i.e., an access direction of the robot hand). The detection area B may be cone-shaped. A height h of the cone-shaped detection area B is obtained in consideration of a model of the robot 60, and the height h is the sum (Max-range) of the length of the robot hand 62 and the length of the arm 64 of the robot. An angle θ of the cone-shaped detection area B is predetermined by a user. Since the larger the angle θ of the cone-shaped detection area B, the larger an area is detected, and an access path, along which the robot hand 62 grasps an object obstacle without collision with the obstacle 72, is selected.

When the calculation of the access score of the selected access path candidate is completed, the calculation unit 30 transmits a control signal to the judgment unit 20, and causes the judgment unit 20 to select another access path candidate among the remaining access path candidates and judge whether or not the robot hand 62 collides with the obstacle 72 when the robot hand 62 moves along the selected access path candidate.

The above process is repeated in respect to the plural access path candidates.

The control unit 40 determines an access path of the robot using the access scores of the access path candidates, thus completing a plan of the access path.

In more detail, the control unit 40 aligns the access scores of the access path candidates in descending order, selects an access path candidate having a relatively high score, and judges whether or not the robot hand 62 succeeds in grasping the object while moving the robot hand 62 along the selected access path candidate.

If the robot hand 62 succeeds in grasping the object, the control unit 40 determines the selected access path candidate as an access path for grasping.

On the other hand, if the robot hand 62 does not succeed in grasping the object, the control unit 40 selects another access path candidate having a relatively high score among the remaining access path candidates except for the previously selected access path candidate, and judges whether or not the robot hand 62 succeeds in grasping the object while moving the robot hand 62 along the selected access path candidate.

A process of selecting an access path candidate and determining whether or not the robot hand 62 succeeds in grasping the object while moving the robot hand 62 along the selected access path candidate is repeated until the robot hand 62 succeeds in grasping the object.

The robot driving unit 50 drives parts, such as actuators and motors, mounted on the robot according to the received access path candidate, and thus controls movement of the robot hand 62 and the robot arm 64, thereby allowing the robot hand 62 to grasp the object.

The judgment unit 20 and calculation unit 30 may execute codes to cause a processing device to perform operations described herein.

Figure 6:
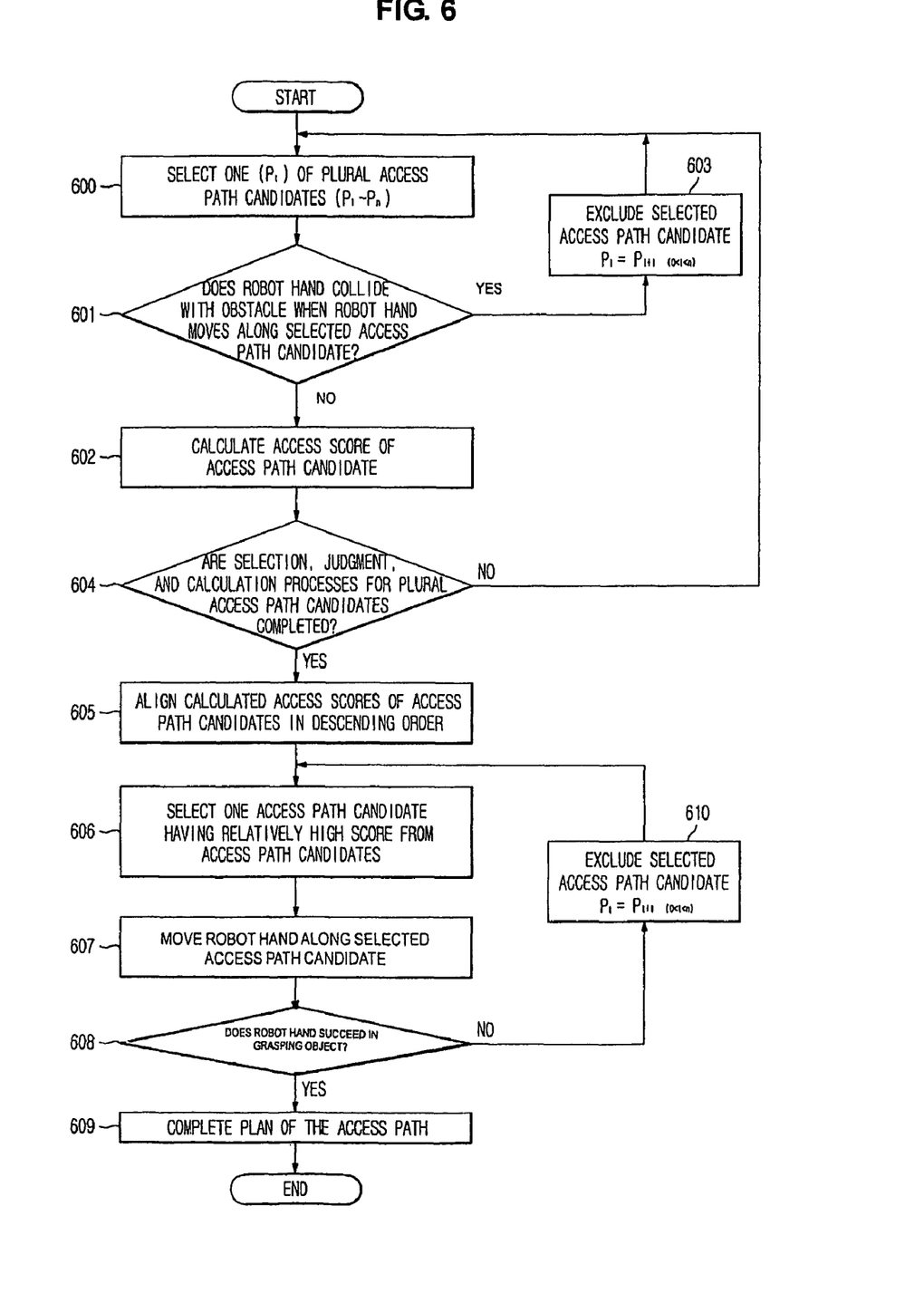
FIG. 6 is a flow chart illustrating a path planning method of a robot in accordance with one embodiment.

FIG. 6 is a flow chart illustrating a path planning method of a robot in accordance with one embodiment.

As shown in FIG. 6, one access path candidate Pt is selected from plural access path candidates P1~Pn along which the robot accesses an object to grasp the object (600).

Thereafter, it is judged whether or not the robot hand 62 collides with the obstacle 72 when the robot hand 62 moves along the selected access path candidate (601). At this time, a virtual object surrounding the robot hand 62 is used instead of the robot hand 62 to judge whether or not the virtual object collides with the obstacle 72.

As the result of the judgment at operation 601, if the robot hand 62 does not collide with the obstacle 72, an access score of the access path candidate is calculated (602).

Here, the access score of the access path candidate is calculated using an access function based on the minimum distance between the robot hand 62 and the obstacle 72, a length of the robot hand 62, and a length of the robot arm 64. The access function is calculated by Equation 1 below.

$$G(\text{score}) = \text{Exp}(\omega * \text{Detect\_Dis}/\text{Max\_range}) \qquad \text{[Equation 1]}$$

Here, Detect_Dis is the minimum distance between the robot hand 62 and the obstacle 72, Max_range is the sum of the length of the robot hand 62 and the length of the robot arm 64, and ω is a constant.

On the other hand, as the result of the judgment of operation 601, if the robot hand 62 collides with the obstacle 72, the access path candidate selected in operation 600 is excluded (603), and then another access path candidate Pt (Pt=Pt+1) is selected from the remaining access path candidates (600). Thereafter, it is judged whether or not the robot hand 62 collides with the obstacle 72 when the robot hand 62 moves along the newly selected access path candidate (601), and as the result of the judgment of operation 601, if the robot hand 62 does not collide with the obstacle 72, an access score of the access path candidate is calculated (602).

The above selection, judgment, and calculation processes are repeated in respect to the plural access path candidates, and then it is judged whether or not all the processes are completed (604).

For one example of the above-described selection, judgment, and calculation processes, a first access path candidate P1 is selected from plural access path candidates P1~Pn. It is judged whether or not the robot hand 62 collides with the obstacle 72 when the robot hand 62 moves along the first access path candidate P1, and if the robot hand 62 does not collide with the obstacle 72, a first access score S1 of the first access path candidate P1 is calculated.

When the calculation process of the first access score S1 of the first access path candidate P1 is completed, operation 600 is performed again. That is, a second access path candidate P2 is selected from the remaining access path candidates P2~Pn, and it is judged whether or not the robot hand 62 collides with the obstacle 72 when the robot hand 62 moves along the second access path candidate P2. If the robot hand 62 does not collide with the obstacle 72, a second access score S2 of the second access path candidate P2 is calculated.

When these processes are repeatedly performed with respect to all the access path candidates P1~Pn, it is judged that all the processes are completed, and operation 605 is performed.

After operation 604 is completed, the access scores of the access path candidates are aligned in descending order (605), and an access path candidate having a relatively high score is selected from the access path candidates (606).

It is judged whether or not the robot hand 62 succeeds in grasping the object (608) while moving the robot hand 62 along the access path candidate selected in operation 606 (607). Here, whether or not the robot hand 62 succeeds in grasping the object is judged by checking whether the robot hand 62 substantially collides with the obstacle 72.

If the robot hand 62 succeeds in grasping the object, the selected access path candidate is determined as an access path for grasping, and a plan of the access path is completed (609).

On the other hand, if the robot hand 62 does not succeed in grasping the object in operation 608, operation 606 is performed again after the selected access path candidate is excluded. That is, the previously selected access path candidate is excluded (610), another access path candidate having a relatively high score is selected among the remaining access path candidates except for the previously selected access path candidate (606), and whether or not the robot hand 62 succeeds in grasping the object is judged (608) while moving the robot hand 62 along the selected access path candidate (607).

The above selection, movement, and success judgment processes are repeated until the robot hand 62 succeeds in grasping the object.

As is apparent from the above description, a path planning apparatus and method of a robot in accordance with one embodiment determines an access path by first detecting effective access path candidates effectively used as access paths, when a robot hand moves along access path candidates, by judging whether or not the robot hand collides with an obstacle, and then secondarily detecting access scores of the detected access path candidates, thereby more precisely determining an access path and thus being capable of safely grasping an object.

Further, a virtual object is used, instead of the robot hand, to judge whether or not the virtual object collides with the obstacle, thereby more easily detecting whether or not the robot hand collides with the obstacle.

Aspects of the present embodiment can also be embodied as computer-readable codes on a computer-readable recording medium. Also, codes and code segments to accomplish the present embodiment can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A path planning method of a robot comprising:
    judging whether or not a robot hand of the robot collides with an obstacle, when the robot hand moves along a first access path candidate selected from a plurality of access path candidates along which the robot hand accesses an object to grasp the object;
    calculating, by a calculating unit, an access score of the selected first access path candidate when the robot hand is judged to not collide with the obstacle; and
    determining, by a control unit, an access path plan using the access score of the selected first access path candidate.

2. The path planning method according to claim 1, further comprising:
    selecting another access path candidate from remaining access path candidates except for the first selected access path candidate when the robot hand is judged to collide with the obstacle; and
    performing the judging, and subsequently performing the calculating for the selected other access path candidate when the robot hand is judged to not collide with the obstacle.

3. The path planning method according to claim 2, wherein the judging and the selecting another access path candidate when the robot hand is judged to collide with the obstacle or calculating the access score when the robot hand is judged to not collide with the obstacle are repeated for all the plurality of remaining access path candidates.

4. The path planning method according to claim 3, wherein the determining of the access path plan using the access score includes:
    aligning the access scores of the plurality of access path candidates for which the robot hand is judged to not collide with the obstacle in descending order;
    selecting a first non-collision access path candidate for which the robot hand is judged to not collide with the obstacle, from the plurality of access path candidates for which the robot hand is judged to not collide with the obstacle, having a relatively high score;
    judging whether or not the robot hand succeeds in grasping the object while moving the robot hand along the selected first non-collision access path candidate; and
    determining the selected first non-collision access path candidate as an access path of the robot when the robot hand succeeds in grasping the object.

5. The path planning method according to claim 4, further comprising:
    selecting another non-collision access path candidate for which the robot hand is judged to not collide with the obstacle having a relatively high score from the remaining non-collision access path candidates except for the previously selected first non-collision access path candidate when the robot hand does not succeed in grasping the object; and
    performing the moving and the grasping success judging of the selected other non-collision access path candidate.

6. The path planning method according to claim 5, wherein the selecting another non-collision access path candidate, the moving, and the grasping success judging are repeated for all the plurality of remaining non-collision access path candidates until the robot hand succeeds in grasping the object.

7. The path planning method according to claim 1, wherein the judging as to whether or not the robot hand collides with the obstacle is achieved by judging whether or not a virtual object surrounding the robot hand collides with the obstacle.

8. The path planning method according to claim 1, wherein the access score of the access path candidate is calculated using an access function based on the minimum distance between the robot hand and the obstacle, a length of the robot hand, and a length of a robot arm of the robot.

9. The path planning method according to claim 8, wherein the access function is calculated by Equation 1 below, $$G(\text{score}) = \text{Exp}(\omega * \text{Detect\_Dis}/\text{Max\_range}) \quad \text{[Equation 1]}$$

here, Detect_Dis is the minimum distance between the robot hand and the obstacle, Max_range is the sum of the length of the robot hand and the length of the robot arm, and $\omega$ is a constant.

10. A path planning apparatus for a robot comprising:
    a judgment unit to judge whether or not a robot hand of the robot collides with an obstacle, when the robot hand moves along one access path candidate selected from a plurality of access path candidates along which the robot hand accesses an object to grasp the object;

a calculation unit to calculate an access score of the selected access path candidate when the robot hand is judged to not collide with the obstacle; and a control unit to determine an access path plan using the access score of the selected access path candidate.

11. The path planning apparatus according to claim 10, wherein the judgment unit judges whether or not a virtual object surrounding the robot hand collides with the obstacle.

12. The path planning apparatus according to claim 10, wherein the access score of the access path candidate is calculated using an access function based on the minimum distance between the robot hand and the obstacle, a length of the robot hand, and a length of a robot arm of the robot.

13. The path planning apparatus according to claim 12, wherein the access function is calculated by Equation 1 below, $$G(score)=Exp(\omega*Detect\_Dis/Max\_range) \quad \text{[Equation 1]}$$

here, Detect_Dis is the minimum distance between the robot hand and the obstacle, Max_range is the sum of the length of the robot hand and the length of the robot arm, and $\omega$ is a constant.

* * * * *